United States Patent [19]

Grantham

[11] Patent Number: 5,042,537
[45] Date of Patent: * Aug. 27, 1991

[54] HOSE ASSEMBLY AND METHOD OF MAKING THE SAME

[75] Inventor: Rodger P. Grantham, Springfield, Mo.

[73] Assignee: Dayco Products, Inc., Dayton, Ohio

[*] Notice: The portion of the term of this patent subsequent to Aug. 28, 2007 has been disclaimed.

[21] Appl. No.: 525,283

[22] Filed: May 17, 1990

Related U.S. Application Data

[60] Division of Ser. No. 192,253, Apr. 25, 1988, Pat. No. 4,951,720, which is a continuation-in-part of Ser. No. 98,641, Sep. 18, 1987.

[51] Int. Cl.⁵ ............................................. B67D 5/06
[52] U.S. Cl. ...................................... 141/59; 141/44; 141/46; 141/302; 285/133.001
[58] Field of Search .................................. 141/44-46, 141/37, 59, 67, 85, 285, 286, 290, 302, 310; 220/85 VR, 85 VS; 285/132, 382, 256, 133.1

[56] References Cited

U.S. PATENT DOCUMENTS

| | | |
|---|---|---|
| 2,926,029 | 2/1960 | St. Clair et al. ...................... 285/382 |
| 3,213,889 | 10/1965 | Cotman, Jr. .................. 285/133.1 X |
| 3,274,316 | 9/1966 | Songer ............................ 138/131 X |
| 3,638,970 | 2/1972 | Sanelquist et al. ............... 285/133.1 |
| 3,940,168 | 2/1976 | Balon .................................. 285/132 |
| 3,980,112 | 9/1976 | Basham .............................. 141/392 |
| 4,090,539 | 5/1978 | Krupp .................................. 141/198 |
| 4,378,124 | 3/1983 | Weirich et al. ................. 285/137 R |
| 4,431,218 | 2/1984 | Paul, Jr. et al. .................... 285/305 |
| 4,529,009 | 7/1985 | Horner et al. ...................... 138/111 |
| 4,566,504 | 1/1986 | Furrow et al. ....................... 141/59 |
| 4,625,539 | 12/1986 | Brooks et al. ....................... 72/40 R |
| 4,687,033 | 8/1987 | Furrow et al. ....................... 141/59 |
| 4,749,009 | 6/1988 | Faeth .................................... 141/45 |
| 4,811,975 | 3/1989 | Paul, Jr. et al. .................... 285/305 |
| 4,842,027 | 6/1989 | Faeth .................................... 141/45 |
| 4,951,720 | 8/1990 | Grantham ............................ 141/44 |

FOREIGN PATENT DOCUMENTS 0155186 9/1985 European Pat. Off. .............. 141/45

*Primary Examiner*—Ernest G. Cusick
*Attorney, Agent, or Firm*—Joseph V. Tassone

[57] ABSTRACT

A hose assembly and method of making the same are provided, the hose assembly having a first fluid passage arrangement therein for conveying a volatile liquid in one direction to a container and a second fluid passage arrangement therein for returning the vapors of the volatile liquid from the container, the assembly comprising a flexible inner hose unit having an outer peripheral surface and defining the first fluid passage arrangement therein, and a flexible outer hose unit having an inner peripheral surface and being disposed around the inner hose unit, the inner peripheral surface of the outer hose unit and the outer peripheral surface of the inner hose unit defining the second fluid passage arrangement therebetween, the inner hose unit having a Venturi section therein that tends to remove liquid from a certain area of the second fluid passage arrangement, the inner hose unit having adjacent intermediate ends, the Venturi section having opposed ends respectively interconnected to the ends of the inner hose unit to provide the first fluid passage arrangement therewith, the improvement wherein the inner hose unit comprises a plurality of separate inner hoses extending in the one direction to one side of the Venturi section and a single inner hose extending away from the other side of the Venturi section in the one direction.

12 Claims, 12 Drawing Sheets

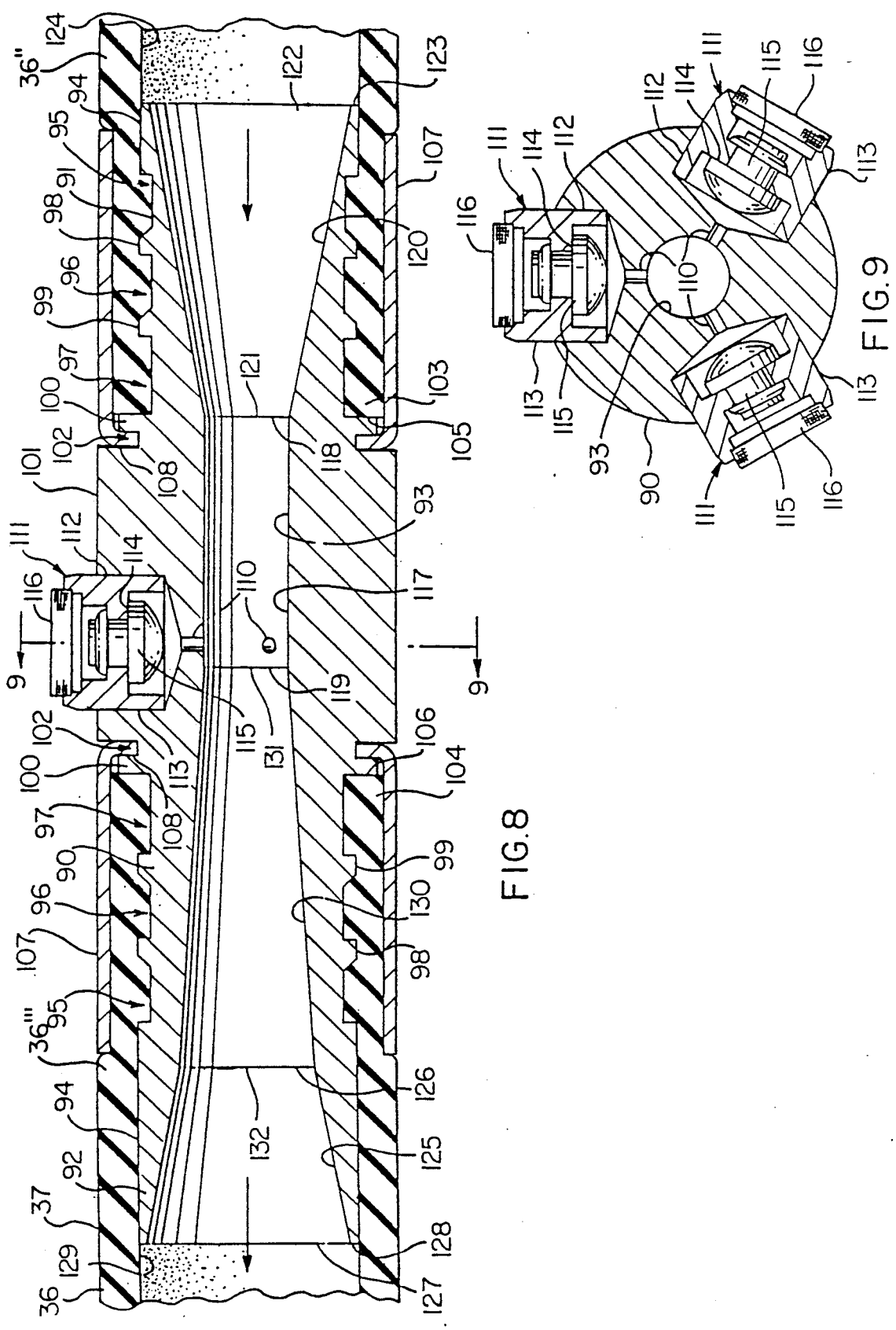

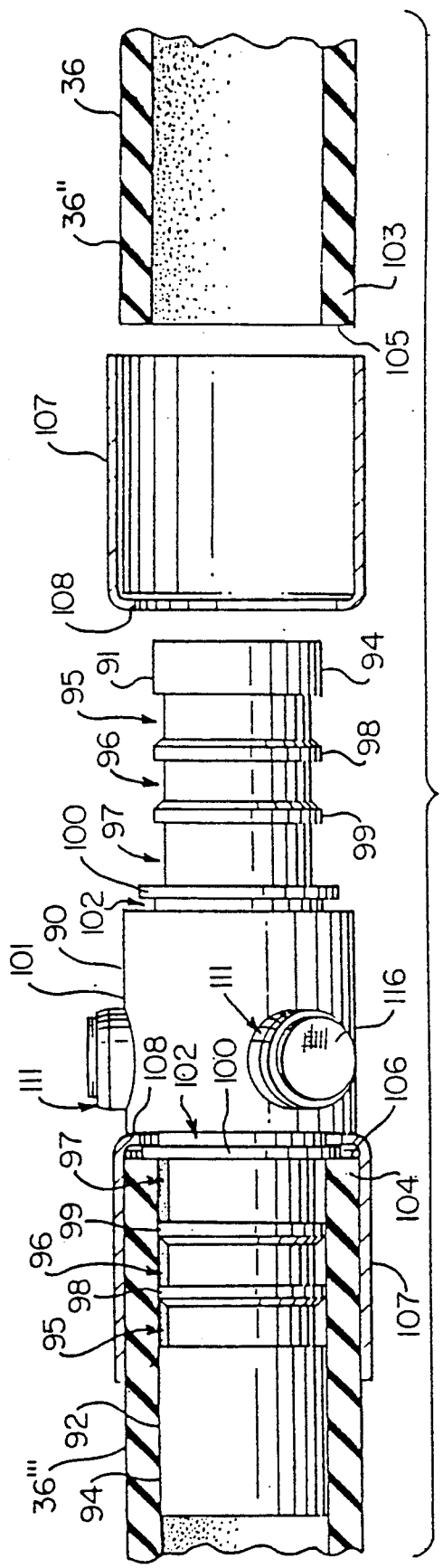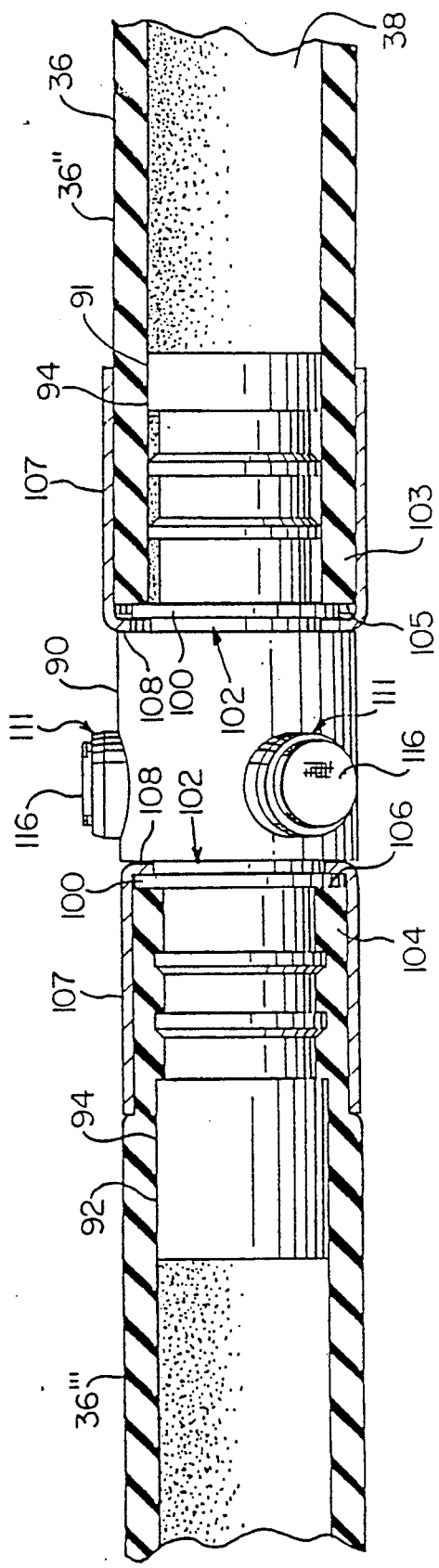

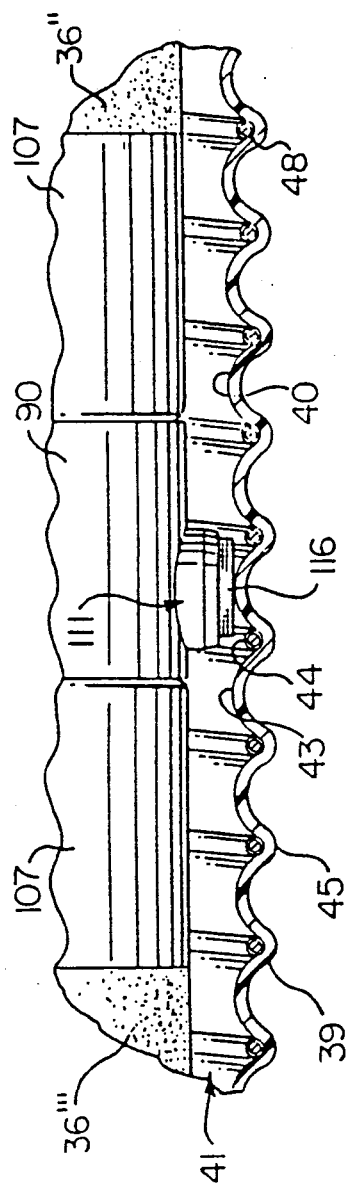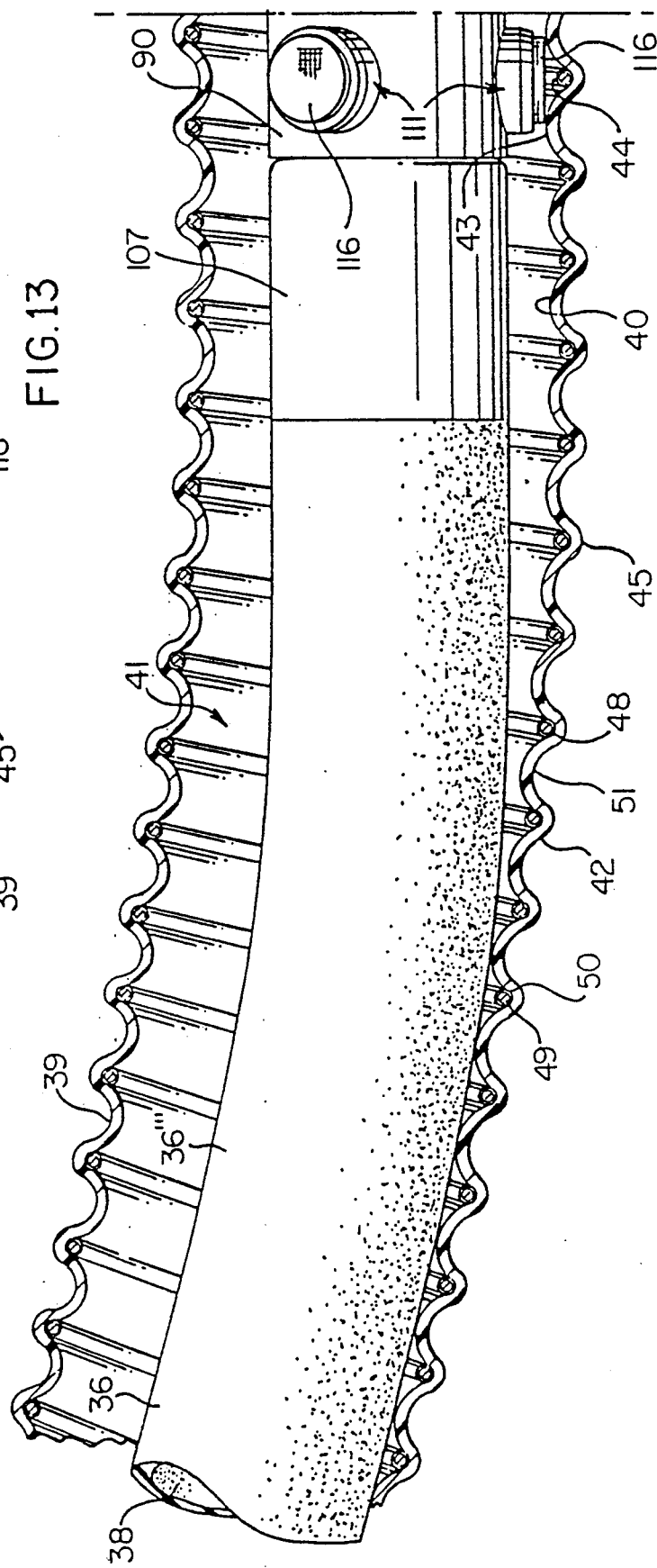

HOSE ASSEMBLY AND METHOD OF MAKING THE SAME

CROSS-REFERENCE TO RELATED APPLICATION

This application is a divisional of Ser. No. 192,253 filed Apr. 25, 1988, now U.S. Pat. No. 4,951,720 which is a continuation-in-part of 98,641, filed Sept. 18, 1987.

BACKGROUND OF THE INVENTION

1. Field of the Invention

This invention relates to a new hose assembly and to a new method of making such a hose assembly.

2. Prior Art Statement

It is known to provide a hose assembly having a first fluid passage means therein for conveying a volatile liquid in one direction to a container and a second fluid passage means therein for returning the vapors of the volatile liquid from the container, the assembly comprising flexible inner hose means having outer peripheral surface means and defining the first fluid passage means therein, and flexible outer hose means having inner peripheral surface means and being disposed around the inner hose means, the inner peripheral surface means of the outer hose means and the outer peripheral surface means of the inner hose means defining the second fluid passage means therebetween, the inner hose means having a Venturi section therein that tends to remove liquid from a certain area of the second fluid passage means, the inner hose means having adjacent intermediate end means, the Venturi section having opposed end means respectively interconnected to the end means of the inner hose means to provide the first fluid passage means therewith. For example, see FIGS. 14, 15, and 16 of this application and the copending patent application of Glenn K. Walker et al, Ser. No. 152,612, filed Feb. 15, 1988, which is a continuation application of Ser. No. 913,060, filed Sept. 29, 1986, now abandoned.

Also, see the Furrow et al, U.S. Pat. No. 4,687,033, for another arrangement wherein one end of an inner hose is telescopically disposed within one end of a Venturi section.

It is also known to provide a plurality of separate hoses to a mixing coupling at the inlet end of a dispensing nozzle construction so as to provide different blends of fuel out of the nozzle construction. For example, see FIG. 25 of this application.

It is also known to provide a plurality of separate inner hoses within an outer hose. For example, see the Weirich et al, U.S. Pat. No. 4,378,124 and the Horner et al, U.S. Pat. No. 4,529,009.

SUMMARY OF THE INVENTION

It is one feature of this invention to provide a new hose assembly wherein vapor recovery, as well as liquid recovery, can be accomplished therewith and therefrom when using a conventional curbside pump or the like that dispenses a plurality of different types or ratings of fuel respectively out of a plurality of outlets thereof so that the same can be subsequently mixed together by a mixing unit to provide a desired blend thereof for dispensing out of a conventional dispensing nozzle construction into the fuel tank of a conventional transportation vehicle or the like.

In particular, it was found according to the teachings of this invention that such conventional curbside pump and its mixing unit are not adapted to utilize the vapor recovery hose assembly that has an inner product hose disposed within an outer hose that defines a vapor recovery passage with the inner hose as set forth in the aforementioned copending patent application, Ser. No. 152,612, filed Feb. 15, 1988.

However, it was found according to the teachings of this invention that a new vapor recovery hose assembly could be provided wherein the inner hose arrangement thereof can comprise a plurality of separate inner hoses for leading from the curbside dispensing unit to one side a Venturi section and a single inner hose for leading from the other side of the Venturi section to the dispensing nozzle construction whereby the Venturi section will still provide for liquid recovery from the hose assembly and a vapor recovery passage means will still be provided between the outer hose and the inner hose arrangement thereof.

For example, one embodiment of this invention provides a hose assembly having a first fluid passage means therein for conveying a volatile liquid in one direction to a container and a second fluid passage means therein for returning the vapors of the volatile liquid from the container, the assembly comprising flexible inner hose means having outer peripheral surface means and defining the first fluid passage means therein, and flexible outer hose means having an inner peripheral surface means and being disposed around the inner hose means, the inner peripheral surface means of the outer hose means and the outer peripheral surface means of the inner hose means defining the second fluid passage means therebetween, the inner hose means having a Venturi section therein that tends to remove liquid from a certain area of the second fluid passage means, the inner hose means having adjacent intermediate end means, the Venturi section having opposed end means respectively interconnected to the end means of the inner hose means to provide the first fluid passage means therewith, the inner hose means comprising a plurality of separate inner hoses extending in the one direction to one side of the Venturi section and a single inner hose extending away from the other side of the Venturi section in the one direction.

Accordingly, it is an object of this invention to provide a new hose assembly having fluid passage means therein for respectively conveying volatile liquids in one direction to a container and returning vapors of the volatile liquids from the container, the hose assembly of this invention having one or more of the novel features of this invention as set forth above or hereinafter shown or described.

Another object of this invention is to provide a new method of making such a hose assembly, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 1 is a side view of the hose assembly of this invention being utilized for dispensing gasoline from a conventional curbside gasoline pump or the like to a nozzle means for insertion in the gasoline tank of a transportation vehicle or the like.

FIG. 8 is an enlarged fragmentary cross-sectional view taken on line 8—8 of FIG. 7.

FIG. 9 is a cross-sectional view taken on line 9—9 of FIG. 8.

FIG. 10 is a reduced exploded view of the parts of the Venturi portion of the hose assembly of this invention before the same have been assembled together.

FIG. 11 is a view similar to FIG. 10 and illustrating how the parts of the assembly of FIG. 10 are secured together.

FIGS. 12A and 12B, when placed end-to-end, provide an enlarged fragmentary cross-sectional view which illustrates how the inner hose of the hose assembly of this invention has the Venturi section thereof arranged in the drape of the hose assembly at a gasoline pump or the like.

FIG. 13 is a fragmentary view similar to FIG. 12A and illustrating the Venturi section in another operating position thereof in the hose assembly.

DESCRIPTION OF THE PREFERRED EMBODIMENTS

Figure 1:
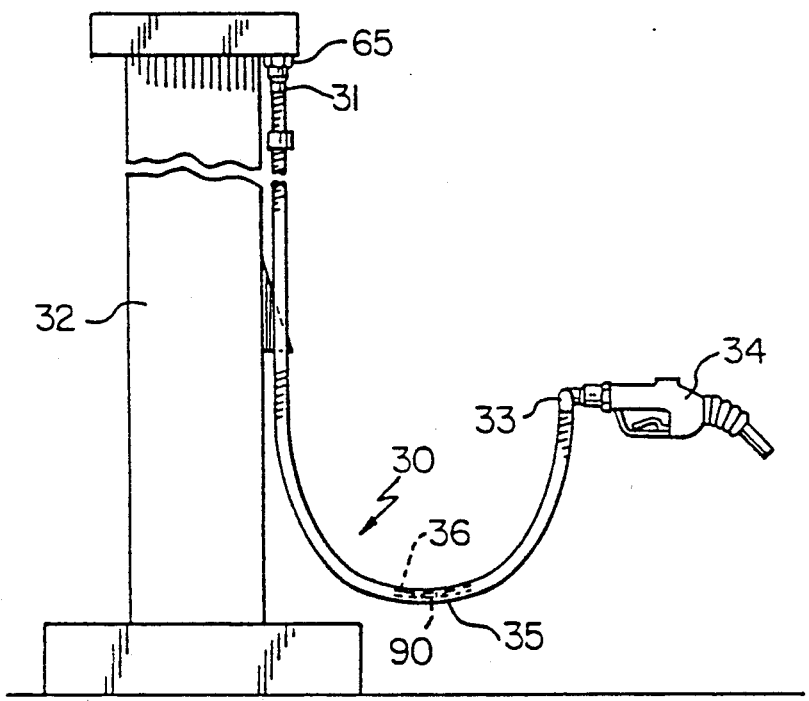

While the various features of this invention are hereinafter illustrated and described as being particularly adapted to provide a hose assembly for conveying volatile fluids, it is to be understood that the various features of this invention can be utilized singly or in various combinations thereof to provide a hose assembly for other purposes as desired.

Therefore, this invention is not to be limited to only the embodiments illustrated in the drawings, because the drawings are merely utilized to illustrate one of the wide variety of uses of this invention.

Referring now to FIG. 1, the new hose assembly of this invention is generally indicated by the reference numeral 30 and is shown in FIG. 1 as having one end 31 thereof interconnected to an outlet means 65 of a conventional gasoline pump 32 or the like and the other end 33 thereof interconnected to a conventional dispensing nozzle 34 which is shown in a normal position for dispensing fuel into the gas tank or storage container of a transportation vehicle or the like (not shown) whereby an intermediate portion of the hose assembly 30 provides a low portion or drape or drape area 35 thereof from which any collected liquid therein is to be removed by the hose assembly 30 of this invention in a manner hereinafter set forth and for the reasons set forth in the aforementioned Furrow et al, U.S. Pat. No. 4,687,033, whereby this patent is being incorporated into this disclosure by this reference thereto.

Figure 6:
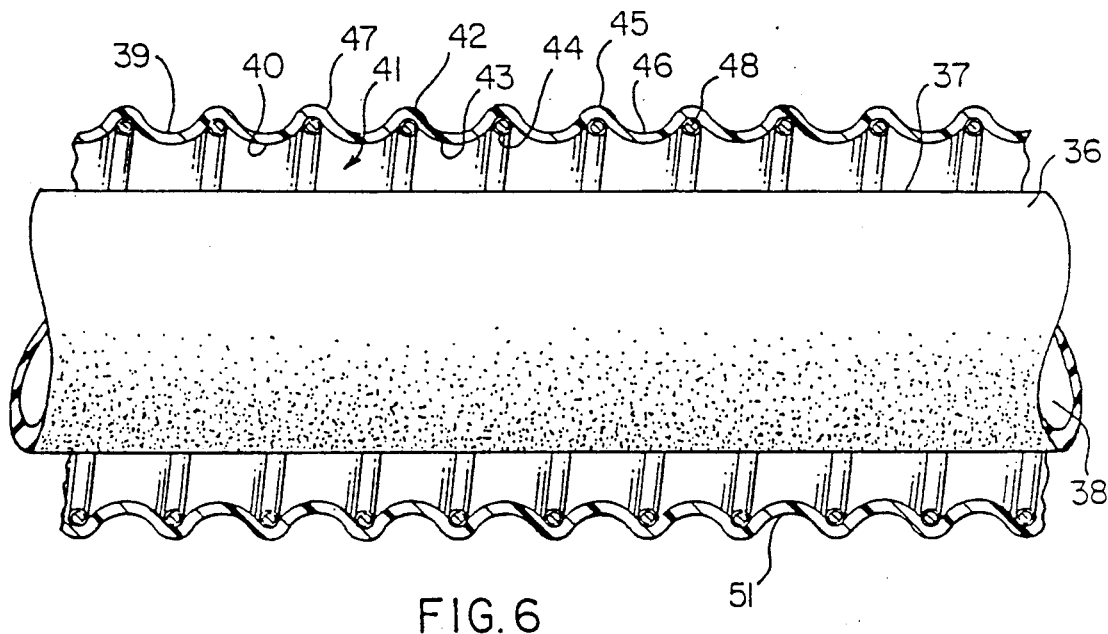
FIG. 6 is a fragmentary cross-sectional view illustrating certain parts of the hose assembly of this invention.
Figure 17:
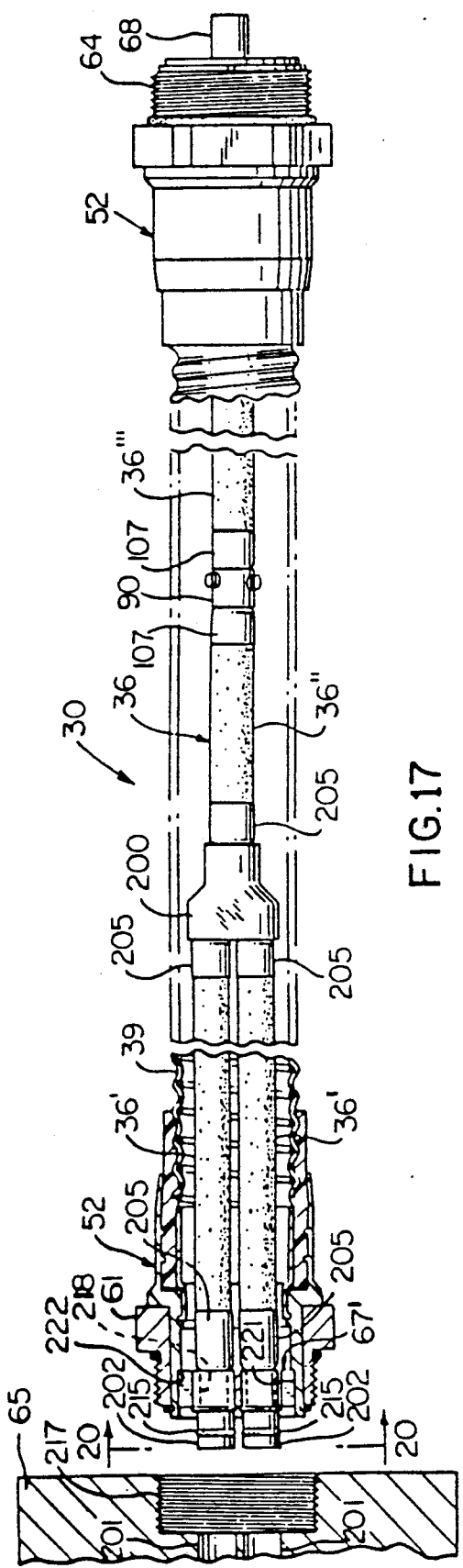
FIG. 17 is a fragmentary view of the new hose assembly of this invention, FIG. 17 being partially in cross section and illustrating an outlet means of a curbside pump means in exploded relation therewith.

The hose assembly 30 of this invention as best illustrated in FIGS. 6 and 17 comprises a flexible inner hose means 36 having outer peripheral surface means 37 and defining inner fluid passage means 38 therein through which the volatile liquid from the pump means 32 is adapted to be conveyed in a direction toward the nozzle construction 34 in a manner hereinafter set forth. The hose assembly 30 also comprises a flexible outer hose means 39 that has an inner peripheral surface means 40 that cooperates with the outer peripheral surface means 37 of the inner hose means 36 to define an outer fluid passage means 41 therebetween and through which vapors of the dispensed volatile liquid can be returned from the nozzle means 34 back to the pump means 32 in a manner conventional in the art such as set forth in the aforementioned Furrow et al, U.S. Pat. No. 4,687,033, as well as in another Furrow et al, U.S. Pat. No. 4,566,504 and the Basham U.S. Pat. No. 3,980,112 whereby these last two patents are also being incorporated into this disclosure by this reference thereto.

It can be seen in FIG. 17 that the inner hose means 36 comprises a plurality of separate hoses 36' at the left end thereof that respectively interconnect to a coupling unit 200 in a manner hereinafter set forth, the coupling unit, in turn, interconnecting to a short hose length 36" of the hose means 36. The short hose length 36", in turn, is interconnected to the left side of a Venturi section 90 in a manner hereinafter set forth while the right side of the Venturi section 90 is interconnected to a single inner hose 36''' that extends to the right end of the hose assembly 30 as will be apparent hereinafter.

Thus, the inner hose means 36 of the hose assembly 30 of this invention comprises the inner hoses 36', 36''' and 36''' which operate in a manner hereinafter set forth. However, it is believed best to first describe in detail the other features of the hose assembly 30 before describing the details 20 of the inner hoses 36′, 36″ and 36‴ and the coupling unit 200.

While the inner hose means 36 has substantially smooth inner and outer peripheral surface means, the main body portion 42 of the outer hose means 39 is corrugated in a helical manner to define alternating crests 43 and valleys 44 on the inner peripheral surface means 40 thereof as well as corresponding and alternating crests 45 and valleys 46 on the outer peripheral surface means 47 thereof as illustrated in FIG. 6, each inner crest 43 and each inner valley 44 defining an arcuate surface 33′ and 34′ for a purpose hereinafter described.

In addition, the outer hose means 39 has a reinforcing wire-like member 48 secured to the inner peripheral surface means 40 thereof and also being disposed in a helical manner along the length of the body portion 42 of the outer hose means 39, the wire reinforcing member 48 being formed of any suitable material, such as metallic material, and thereby rendering the outer hose means 39 substantially resistant to inward crushing thereof about the inner hose means 36 for a purpose hereinafter set forth. However, because the body portion 42 of the outer hose means 39 is corrugated in the manner previously set forth, the outer hose means 39 is relatively flexible.

While the body portion 42 of the outer hose means 39 can be formed of any suitable material, one working embodiment thereof is formed by the method of providing a precurved metallic wire helix 49 (FIG. 12A) with an external urethane coating 50 thereon. Thereafter, an outer cover 51 of urethane is extruded over the coated reinforcing member 48 whereby the coating 50 thereon enhances the adhesion of the outer urethane material 51 to the reinforcing wire 48 while the resulting structure has the wire 49 effectively embedded therein. Of course, the body portion 42 of the outer hose 39 could be formed of different material and by a different method, if desired.

Figure 3:
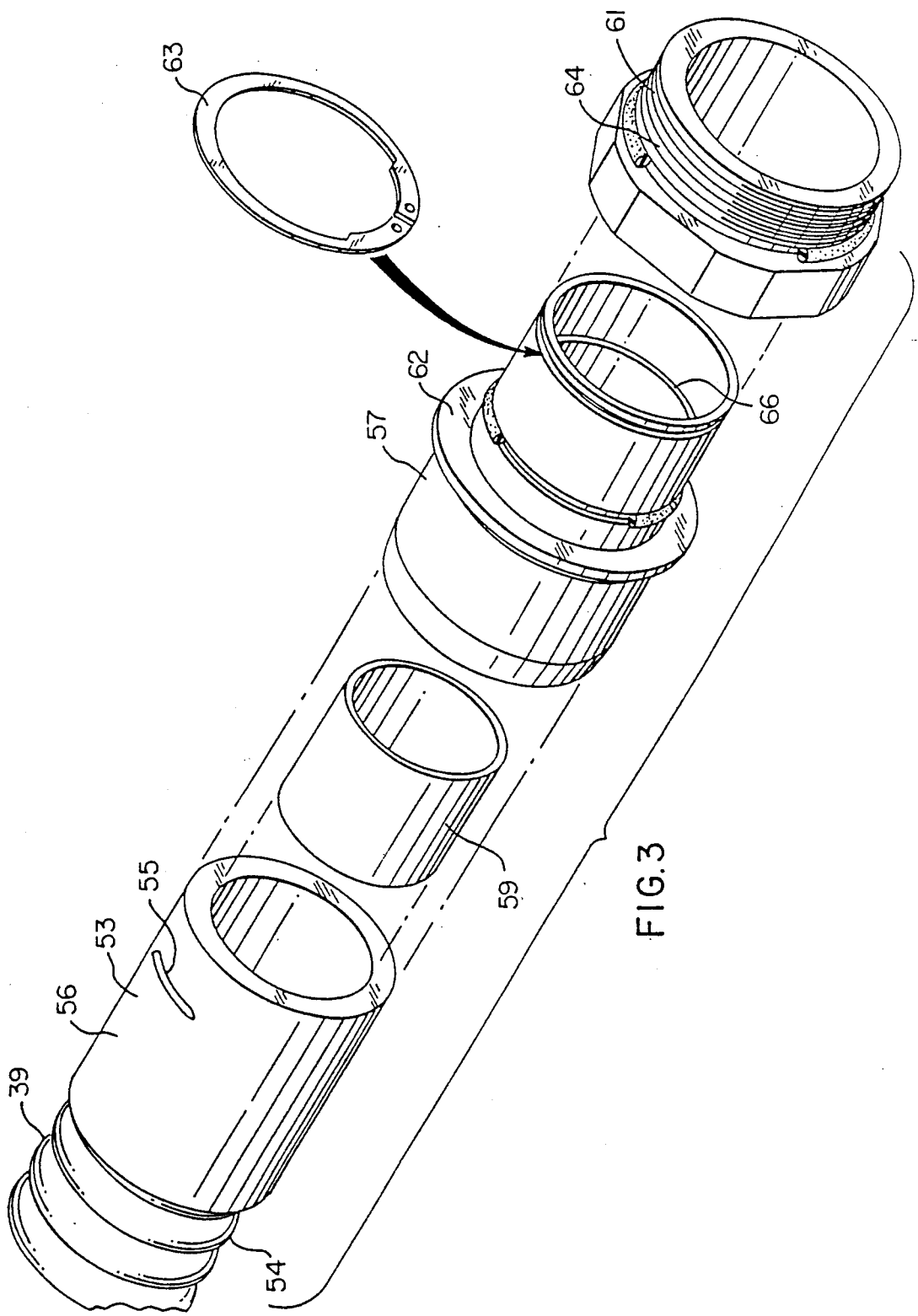
FIG. 3 is an exploded perspective view of the various parts of the end of the hose assembly of FIG. 2.
Figure 4:
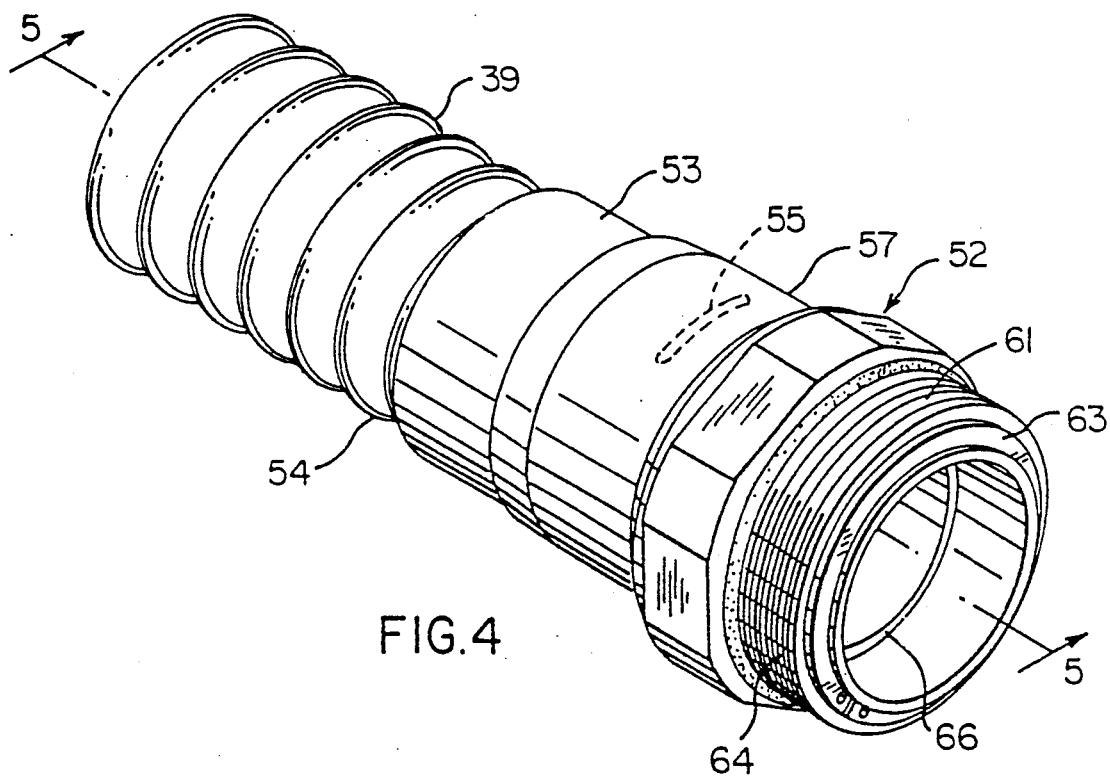
FIG. 4 is a perspective view illustrating the parts of FIG. 3 in their assembled relation.
Figure 5:
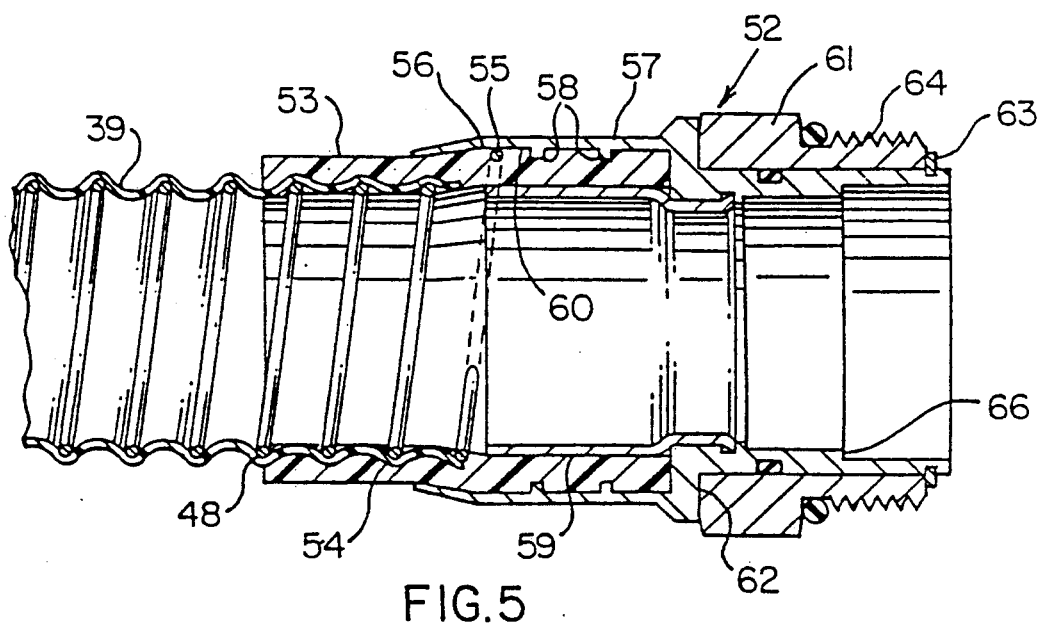
FIG. 5 is a fragmentary cross-sectional view taken on line 5—5 of FIG. 4.

In order to attach outer couplings 52 to the opposed ends of the body portion 42 of the outer hose means 39, substantially smooth and nonreinforced cylindrical cuffs 53 of urethane are respectively bonded or molded to the opposed ends 54 of the outer hose means 39 as illustrated in FIGS. 3, 5 and 17 so that the cuffs 53 can be subsequently secured to the couplings 52 in any suitable manner, such as the manner set forth in the aforementioned Basham U.S. Pat. No. 3,980,112.

However, before the cuffs 53 are molded on the ends 54 of the outer hose means 39, and end portion 55 of the reinforcing wire 48 at each end 54 of the outer hose means 39 has the coating 50 thereon removed as well as the outer cover 51 so that the same will tend to extend outwardly beyond the outer peripheral surface 56 of the subsequently molded cuff 53 in the manner illustrated in FIG. 3 so as to provide an electrical connection between the opposed end couplings 52 of the hose assembly 30 for antistatic purposes.

In particular, each coupling 52 comprises an outer metal tubular coupling member 57 that is adapted to be telescoped over the respective cuff 53 and have a plurality of inwardly directed ribs 58 thereof embedded into the respective cuff 53 when an internally disposed metallic sleeve 59 is outwardly expanded within the coupling member 57 in the manner illustrated in FIG. 5 to hold the cuff 53 to the coupling 52, the bared end 55 of the wire 49 being maintained in electrical contact with the internal peripheral surface 60 of the metallic coupling member 57 in the manner illustrated in FIG. 5. In this manner, the wire 49 electrically interconnects the two end couplings 52 for the hose assembly 30.

Figure 18:
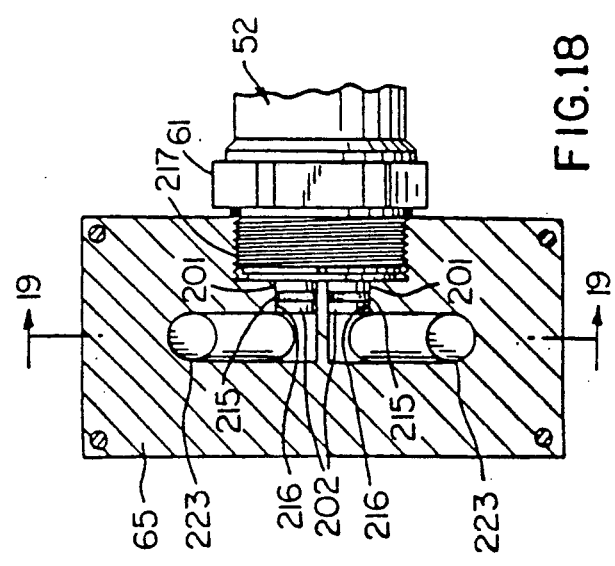
FIG. 18 is a fragmentary view similar to FIG. 17 and illustrates the hose assembly of this invention interconnected to the outlet means of FIG. 17.

Each coupling 52 includes a tubular member 61 rotatably disposed thereon between an annular shoulder 62 of the tubular member 57 and a split ring retainer 63 as illustrated in FIG. 5 whereby the member 61 can have external threads 64 thereof threaded to internal threads so as to couple the coupling 52 to either the nozzle construction 34 or the coupling structure 65 of the pump 32 in a manner conventional in the art and as illustrated in FIG. 18.

Figure 2:
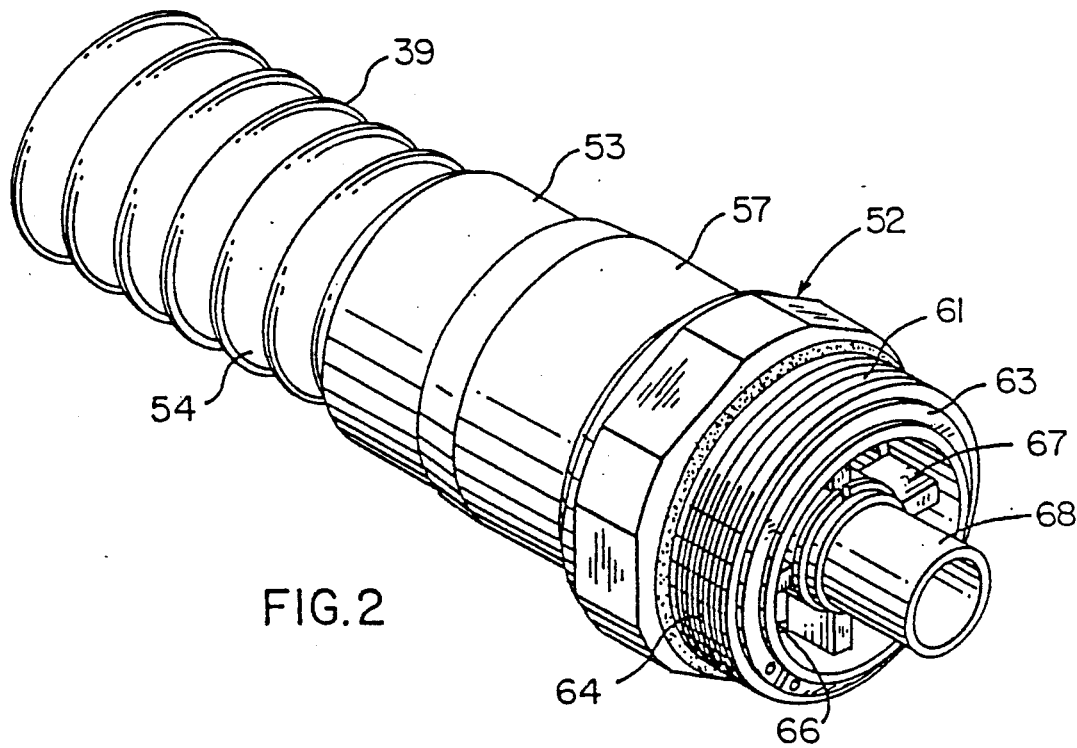
FIG. 2 is an enlarged fragmentary perspective view of one end of the hose assembly of this invention.

The tubular member 57 of the coupling 52 defines an internal annular shoulder 66 against which a clip means 67, FIG. 2, abuts so as to substantially concentrically mount end fitting means 68 of the inner hose means 36 within the respective coupling 52 in substantially the same manner as set forth in the aforementioned Basham U.S. Pat. No. 3,980,112. In this manner each end means of the inner hose means 36 is supported by the end clip means 67 in the couplings 52 at the opposed ends of the outer hose means 39 whereby the inner hose means 36 is carried in the outer hose means 39 to complete the hose assembly 30.

Since the coupling 52 and clip means 67 for the hose assembly 30 of this invention for coupling to the nozzle construction 34 are fully disclosed and claimed in the aforementioned copending patent application of Glenn K. Walker et al, Ser. No. 152,612, a further discussion thereof is deemed unnecessary other than to state that when the hose assembly 30 is coupled to the nozzle construction 34 and to the gasoline pump 32 in the manner illustrated in FIGS. 1 and 18, the fluid passage means 38 in the inner hose means 36 is adapted to direct volatile fuel from the pump means 32 to the nozzle 34 to be dispensed therefrom in a conventional manner while the second fluid passage means 41 defined between the outer hose means 39 and inner hose means 36 is adapted to be utilized to return vapors from the dispensing operation at the nozzle construction 34 back to the pump means 32 for a vapor recovery purpose that is well known in the art.

It is also known, as fully described in the aforementioned Furrow et al, U.S. Pat. No. 4,687,033, that liquid in the outer passage means 41 of the hose assembly 30 tends to collect at the low point or drape area 35 of the hose assembly 30 as illustrated in FIG. 1 and it is known from others to include a Venturi section in the inner hose means 36 so that the same can have its inlet means disposed in the passage means 41 at the drape area 35 for sucking the collected liquid from the drape area 35 and directing the same back into the inner fluid passage means 38 of the inner hose means 36 so as to be directed back to the nozzle 34 as the liquid flows through the inner passage means 38 from the pump means 32 and passes through the Venturi section to the nozzle construction 34.

It was found, according to the teachings of this invention, that such an internal Venturi section as set forth in the aforementioned copending patent application of Glenn K. Walker et al, Ser. No. 152,612, resulted in the effective length of the straight portion of the inner hose means of the hose assembly to be relatively long so that the drape area thereof cannot be bent by a user of the hose assembly 30 in properly dispensing fuel from the pump means 32 to that user's gasoline tank.

Figure 14:
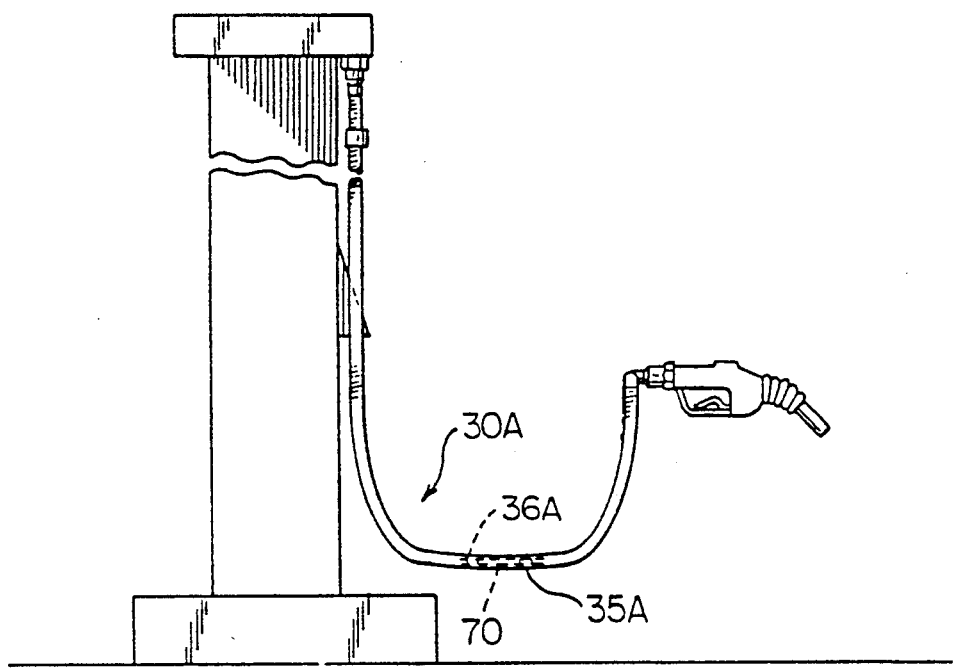
FIG. 14 is a view similar to FIG. 1 and illustrates the drape of the prior known hose assembly as set forth in the aforementioned copending patent application of Glenn K. Walker et al, Ser. No. 152,612, filed February, 1988.

For example, reference is now made to FIG. 14 wherein the prior known hose assembly is generally indicated by the reference numeral 30A and the drape or low area 35A thereof is shown as having a relatively long straight section therein that is provided by the effective straight length of the Venturi section in the inner hose thereof.

Figure 15:
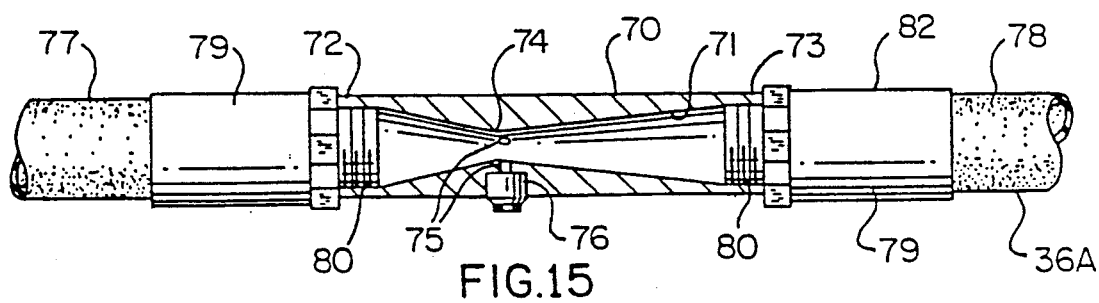
FIG. 15 is an enlarged fragmentary view, partially in cross section, of the Venturi portion of the inner hose of the prior known hose assembly of FIG. 14.
Figure 16:
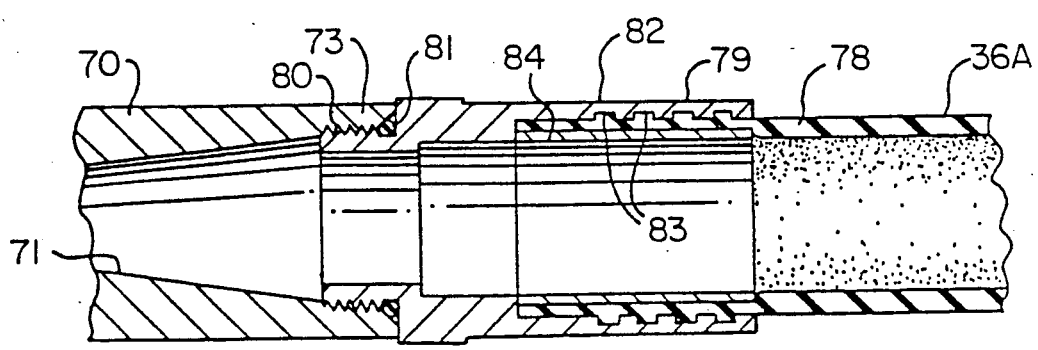
FIG. 16 is an enlarged fragmentary cross-sectional view of one end of the Venturi section and the inner hose of FIG. 15.

In particular, such prior known hose assembly 30A has the inner hose means 36A thereof, as illustrated in FIGS. 15 and 16, provided with a straight Venturi section 70 that is formed of metallic material and has a flow passage 71 passing therethrough and through the opposed ends 72 and 73 thereof. The flow passage 71 has a reduced throat area 74 which communicates with a plurality of port means 75 that extend substantially radially outwardly to communicate with the outer flow passage in the hose assembly (not shown) to draw any liquid contained therein into the throat portion 74 and, thus, into the flow passage 71 for the reasons previously set forth. Each port means 75 has a one-way check valve means 76 disposed therein so as to prevent liquid from flowing from the Venturi section 70 outwardly through the port means 75.

The opposed ends 72 and 73 of the Venturi section 70 are respectively interconnected to adjacent end portions 77 and 78 of the inner hose means 36A by like coupling members 79. As illustrated in FIG. 16, each coupling member 79 has an externally threaded end 80 that threads into the adjacent internally threaded end 73 of the Venturi section 70 and is sealed thereto by suitable sealing means 81. The respective coupling member 79 is in turn interconnected to its adjacent end 78 of the inner hose 36A by having that end 78 telescoped within a tubular portion 82 of the coupling member 79 and being outwardly radially compressed into annular grooves 83 formed internally in the tubular portion 82 by an expanded metallic sleeve 84.

However, it was found that such a coupling arrangement for the Venturi section 70 created a straight length in the inner hose 36A that was approximately 5.585 inches that resulted in the substantially straight unbendable section 5A in the hose assembly 30A as illustrated in FIG. 14.

Accordingly, it was found according to the teachings of this invention that the adjacent ends of the inner hose means could be telescoped onto adjacent ends of the Venturi section so as to reduce the overall effective straight length of the Venturi portion of the inner hose means as well as to provide a smooth transition between the inner hose means and the Venturi section.

Figure 7:
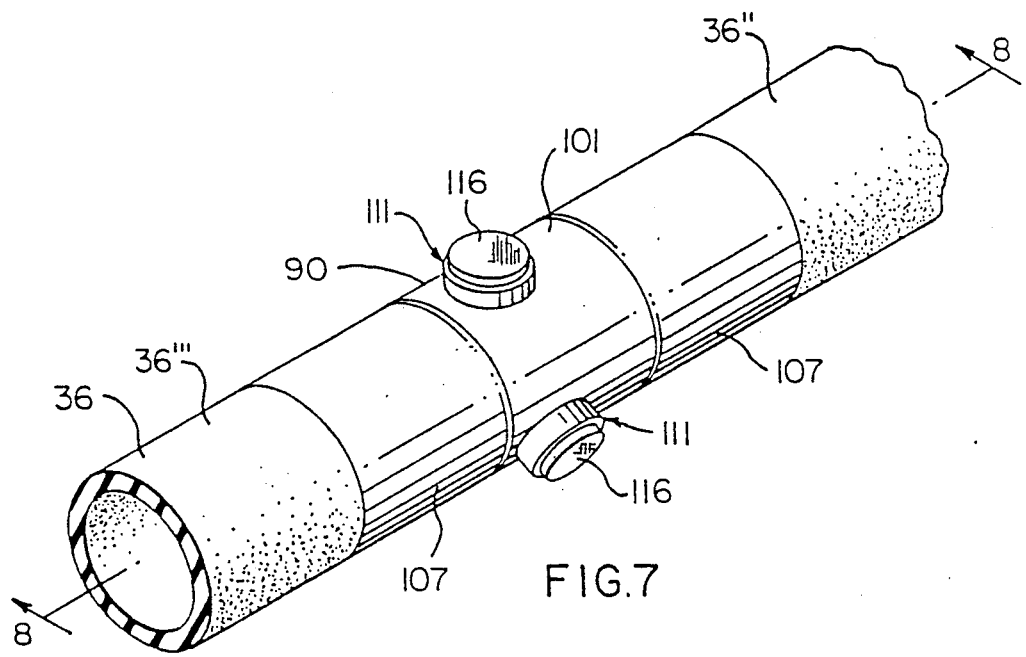
FIG. 7 is a fragmentary perspective view illustrating the Venturi section of the inner hose of the hose assembly of this invention.

For example, reference is now made to FIGS. 7 and 8 wherein the new Venturi section of this invention is generally indicated by the reference numeral 90 and comprises a substantially cylindrical block of metallic material having opposed ends 91 and 92 through which a flow passage 93 extends with the flow passage 93 being uniquely arranged in a manner hereinafter set forth.

Each end 91 and 92 of the Venturi section 90 has an end cylindrical portion 94 with the end cylindrical portion 94 at the end 92 being longer than the end cylindrical portion 94 at the inlet end 91 of the Venturi section 90 for a purpose hereinafter described. However, each end 91 and 92 has three annular grooves 95, 96 and 97 formed therein which respectively define intermediate outwardly directed annular rib-like portions 98 and 99 as illustrated. In addition, each end 91 and 92 has an outwardly directed annular flange 100 that cooperates with an intermediate enlarged cylindrical body portion 101 to define an annular groove 102 therewith, each flange 100 extending outwardly beyond the ribs 98 and 99 as well as its respective end cylindrical portion 94 as illustrated. Therefore, it can be seen that the Venturi section 90 has a substantially circular cross-sectional configuration throughout the length thereof with the diameter thereof varying as illustrated.

The inner hose means 36 has adjacent ends 103 and 104 adapted to be respectively telescopically disposed over the ends 91 and 92 of the Venturi section 90 as illustrated and having the respective end surfaces 105 and 106 therewith abut against the respective flanges 100 so as to limit the degree of insertion of the ends 103 and 104 on the respective ends 91 and 92 of the Venturi section 90. However, either before or at the same time the ends 103 and 104 of the inner hose means 36 are being telescoped over the ends 91 and 92 of the Venturi section 90, substantially cylindrical metal sleeves 107 are telescoped over the ends 91 and 92 of the Venturi section 90 illustrated in FIGS. 10 and 11 with each sleeve 107 having an initially inwardly turned annular flange 108 that is of a size that permits the same to readily slip over its adjacent flange 100 and be aligned with its annular groove 102 as illustrated to the right in FIG. 11, the internal diameter of the inner hose means 36 being substantially the same as the outer diameter of the cylindrical part 94 and ribs 98 and 99 of the respective end 91 or 92 of the Venturi section 90 as illustrated by the right-hand portion of FIG. 11.

Thereafter, the sleeves 107 are radially inwardly compressed in any suitable manner, such as in the manner set forth in the Brooks et al, U.S. Pat. No. 4,625,539, which patent is being incorporated into this disclosure by this reference thereto, whereby each radially inwardly compressed sleeve 107 radially inwardly compresses the respective end 103 or 104 of the inner hose means 36 into the annular grooves 95, 96 and 97 in the manner illustrated in FIG. 8 at the same time that the turned flange 108 of the sleeve 107 is received into the annular groove 102 to hold the collapsed sleeve 107 on the Venturi section 90. It can be seen in FIG. 8 that the outer peripheral surface of each radially inwardly compressed sleeve 107 is substantially coplanar with the external peripheral surface 37 of the inner tubular member 36 as illustrated.

In this manner, it can be seen that the effective overall length of the straight Venturi portion of the inner hose means 36 can be reduced over the effective straight length of the Venturi portion of the prior known arrangement illustrated in FIG. 15 because the effective straight length of the Venturi portion illustrated in FIG. 8 is approximately only 3.475 inches whereas the effective straight length of the Venturi portion illustrated in FIG. 16 is approximately 5.585 inches.

Figure 12B:
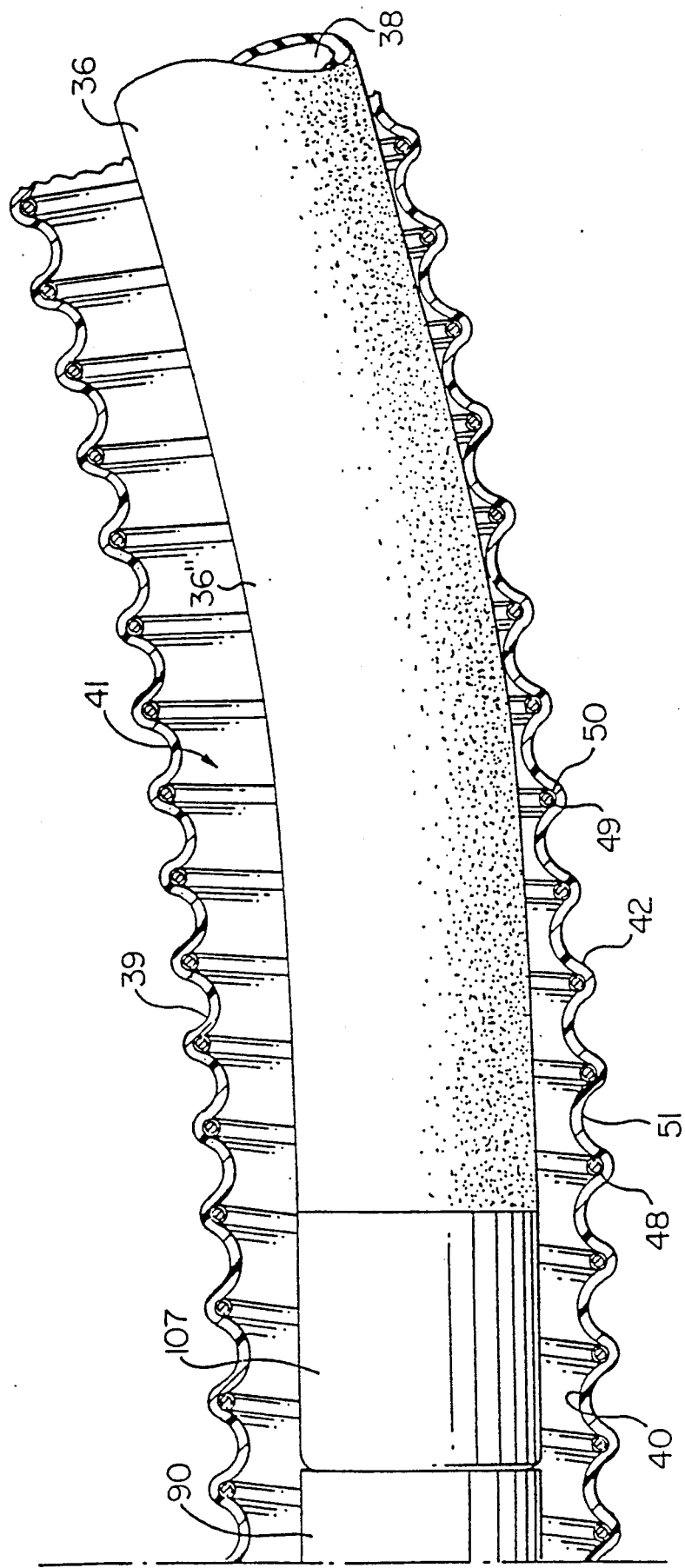

In this manner, such shortened effective straight length of the inner hose means 36 permits the inner hose means 36 to be disposed with a more curved draped portion 35 of the hose assembly 30 when the same is assembled to the pump 32 and nozzle 34 and the nozzle 34 is being disposed in the dispensing position illustrated in FIG. 1 and in the manner illustrated in FIGS. 12A and 12B.

The enlarged central portion 101 of the Venturi section 90 has a plurality of radially disposed port means 110 formed therethrough and leading to the fluid passage 93 through the Venturi section 90 at one end thereof and to the exterior of the Venturi section 90 at the other end thereof so as to communicate with the fluid passage 41 to suck any liquid fuel contained therein from the low portion or drape 35 of the hose assembly 30 as previously set forth. However, a plurality of one-way check valve means 111 are disposed in the port means 110 in enlarged outer ends 112 thereof, the check valve means 111 each comprising a tubular housing means 113 having an internal valve seat 114 therein that is adapted to be opened and closed by a one-way umbrella type check valve member 115 carried by the housing means 113.

Each check valve means 111 includes a substantially flat disc-like filter member 116 that defines an inlet for the respective port means 110 so as to filter any fluid flow therethrough which will be created by the fluid flow through the passage means 93 from the end 91 thereof to the end 92 thereof in a manner well known in the Venturi art so that the fluid flow through the inlet 116 opens the umbrella valve member 115 and permits the liquid to flow through the port means 110 to the flow passage 93 as previously set forth and be entrained in the fuel flow therethrough.

The port means 110 in the Venturi section 90 are disposed in a uniformly spaced apart circular array thereof as illustrated in FIG. 9 so that in any position of the Venturi section 90 in the hose assembly 30, at least one of the port means 110 will be below the center line of the Venturi block 90 so as to remove liquid from the lowest portion of the drape 35 of the hose assembly 30.

As set forth in the aforementioned copending patent application of Glenn K. Walker et al, Ser. No. 152,612, filed Sept. 18, 1987, the size of the inlets 116 and the size of the internal crests and valleys 43 and 44 are such that even though one of the port means 116 is pointing directly downwardly so as to engage against the internal peripheral surface 40 of the outer hose means 39 in the manner illustrated in FIG. 12A or 13, wherein the inlet 116 is bridging a valley 44 in FIG. 12A or engaging against a crest 43 as illustrated in FIG. 13, that inlet 116 is not blocked by the internal peripheral surface 40 because of the size of the crests and valleys 43 and 44 and the size of the particular inlet 116.

In particular, in one working embodiment of a hose assembly, the diameter of the inlet or filter means 116 is approximately 0.318 of an inch, the maximum diameter of the Venturi section 90 at the inlets 116 that describes a circle is approximately 1.070 inches, the inside diameter of the outer hose means 39 at the crests 43 thereof is approximately 1.250 inches, the inside diameter at the valleys 44 thereof is approximately 1.300 inches, the outside diameter of the hose means 39 at an external crest 45 is approximately 1.500 inches, the pitch between adjacent turns of the wire reinforcing means 48 is approximately 0.333 of an inch, the thickness of the wall covering 51 is approximately 0.040 of an inch, the diameter of the wire means 48 is approximately 0.060 of an inch as the wire 49 has a diameter of approximately 0.050 of an inch and the thickness of the covering 50 on the wire 49 is approximately 0.005 of an inch, the outside diameter of the inner hose means 36 is approximately 0.900 of an inch and the inside diameter is approximately 0.625 of an inch with the inner hose means 36 being formed of nitrite rubber that is internally reinforced with a wire braid or a cloth braid, and, as previously set forth, the length of the Venturi section 90 is approximately 3.475 of an inch.

The flow passage 93 through the Venturi section 90 is uniquely arranged so as to define an intermediate cylindrical portion 117 that has opposed ends 118 and 119 with a substantially uniform circular transverse cross-sectional configuration throughout the length thereof, the ports 110 interrupting the cylindrical portion 117 closely adjacent the downstream end 119 thereof as illustrated in FIG. 8.

The flow passage 93 of the Venturi section 90 defines an inlet portion 120 that is substantially frusto-conical with its smaller base 121 joining the end 118 of the cylindrical portion 117 and having substantially the same diameter therewith, the larger base 122 of the frusto-conical portion 120 interrupting the end surface 123 of the Venturi section 90 at a point closely adjacent the internal peripheral surface 124 of the inner hose 36 as illustrated.

An outlet frusto-conical portion 125 is formed by the passage 93 at the end 92 of the Venturi section 90 with the frusto-conical portion 125 having a small base 126 and a large base 127 with the large base 127 interrupting the end surface 128 of the Venturi section 90 so as to be disposed closely adjacent the internal peripheral surface 129 of the inner hose 36 as illustrated.

Another frusto-conical portion 130 is formed by the passage 93 in the Venturi section 90 intermediate the cylindrical portion 117 thereof and the outlet frusto-conical portion 125, the frusto-conical portion 130 having a smaller base 131 thereof joining the end 119 of the cylindrical portion 117 and being substantially of the same diameter therewith while the larger base 132 of the frusto-conical portion 130 joins the smaller base 126 of the end frusto-conical portion 125 and has substantially the same diameter therewith.

In the previously described working embodiment of the Venturi section 90 of this invention, the section 90 is formed of aluminum, the length of the cylindrical portion 117 is approximately 0.755 of an inch with a diameter of approximately 0.225 of an inch, the length of the inlet frusto-conical portion 120 is approximately 0.960 of an inch with the larger base 122 thereof having a diameter of approximately 0.600 of an inch so that the angle being defined by the frusto-conical portion 120 is approximately 22°, the intermediate frusto-conical portion 130 has a length of approximately 1.420 inches with the larger base 131 thereof defining a diameter of approximately 0.405 of an inch so that the same makes an angle of approximately 7°, and the outlet frusto-conical portion 125 has a length of approximately 0.355 of an inch with the larger base 127 thereof having a diameter of approximately 0.600 of an inch so that the same defines an angle of approximately 31°.

It was found according to the teachings of this invention that the aforementioned working embodiment of the Venturi section 90 provided for a smooth transition of the flow of fuel from the inlet end 103 of the inner hose means 36 through the flow passage 93 and by having the two-stage exit frusto-conical portions 130 and 125, the initial gradual 7° angle of the first frusto-conical portion 130 seems to prevent flow separation before the fluid expands outwardly into the outlet frusto-conical portion 125 so as to tend to help to prevent "movement" of the low pressure location of the pressure drop in the cylindrical portion 116 that performs the sucking function as previously set forth. Also, it has been found that the cylindrical portion 117 can have an increased diameter over the diameter of the prior known Venturi section (0.225 versus 0.218) so as to reduce pressure drop therethrough which allows for higher flow rates to the nozzle construction 34 by the pump means 32.

Therefore, it can be seen that in the operation of the hose assembly 30 of this invention, whenever an operator dispenses fuel out of the nozzle construction 34 into a gasoline tank or the like the Venturi section 90 will be located in the lowest portion or drape 35 of the hose assembly 30 and because of the flow of fuel through the flow passage 93 of the Venturi section 90, a vacuum is created in the port means 110 which tends to draw any liquid that is collected in the outer passage 41 of the hose assembly 30 in the drape or low area 35 thereof into the fuel flowing through the flow passage 93 so as to remove the same from blocking the flow passage means 41 which returns the vapors to the pump means 32 in a manner hereafter set forth.

In addition, it can be seen that because the straight portion of the Venturi section 90 is the only part that requires the inner hose 36 to be substantially straight in the low area 35 of the hose assembly 30, the hose assembly 30 can have the drape or low area 35 thereof relatively arcuate in contrast to the nonarcuate low portion of the prior known hose assembly arrangement illustrated in FIG. 14.

AS previously stated, one of the features of the new hose assembly 30 of this invention is to permit the same to provide a vapor and liquid recovery means for a conventional type of curbside pump means 32 that has a plurality of outlets for respectively dispensing different types or ratings of fuel to be mixed together before being dispensed by the nozzle construction 34 into the gasoline tank or storage container of a transportation vehicle so that such dispensed fuel will have the desired rating, such as desired octane rating, that the operator had selected for purchasing from the pump means 32.

Figure 25:
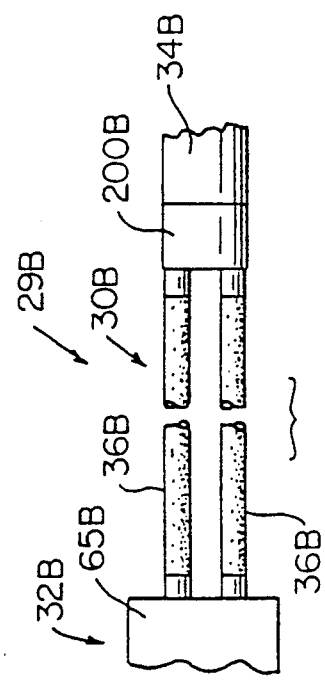
FIG. 25 is a fragmentary schematic view illustrating a prior known fuel dispensing arrangement.

For example, reference is now made to FIG. 25 wherein a prior known fuel dispensing system is generally indicated by the reference numeral 29B and comprises a dispensing pump means 32B having an outlet means 65B, a hose assembly 30B, a coupling or mixing unit 200B and a nozzle construction 34B.

The hose assembly 30B comprises two separate flexible hoses 36B' respectively having their left-hand ends interconnected to separate outlets (not shown) of the outlet means 65B and their right-hand ends interconnected to inlet means (not shown) of the mixing unit 200B which in turn has its single outlet (not shown) interconnected to the single inlet (not shown) of the dispensing nozzle 34B so that a single flow of fuel will flow through the nozzle construction 34B to the gasoline tank of the transportation vehicle even though the outer ends of the two lines 36B' of the hose assembly 30B are directing fuel with different ratings to the coupling unit 200B to be mixed therein and provide that single flow of fuel out of the nozzle means 34B.

Thus, it can be seen that in the prior known system 29B illustrated in FIG. 25, the mixing arrangement 200B is not readily adapted to permit an outer and inner vapor recovery hose arrangement to interconnect the outlet means 65B with the coupling unit 200B to provide for vapor recovery as well as liquid recovery therein and therefrom.

However, it can readily be seen in FIG. 17 that the hose assembly 30 of this invention is readily adapted to couple with the conventional outlet means 65 that has a plurality of separate outlets 201 and interconnect with a single inlet (not shown) of the dispensing nozzle construction 34 when the same is coupled onto the threaded portion 64 of the right-hand coupling means 52 of the hose assembly 30 as illustrated in FIG. 17.

Figure 21:
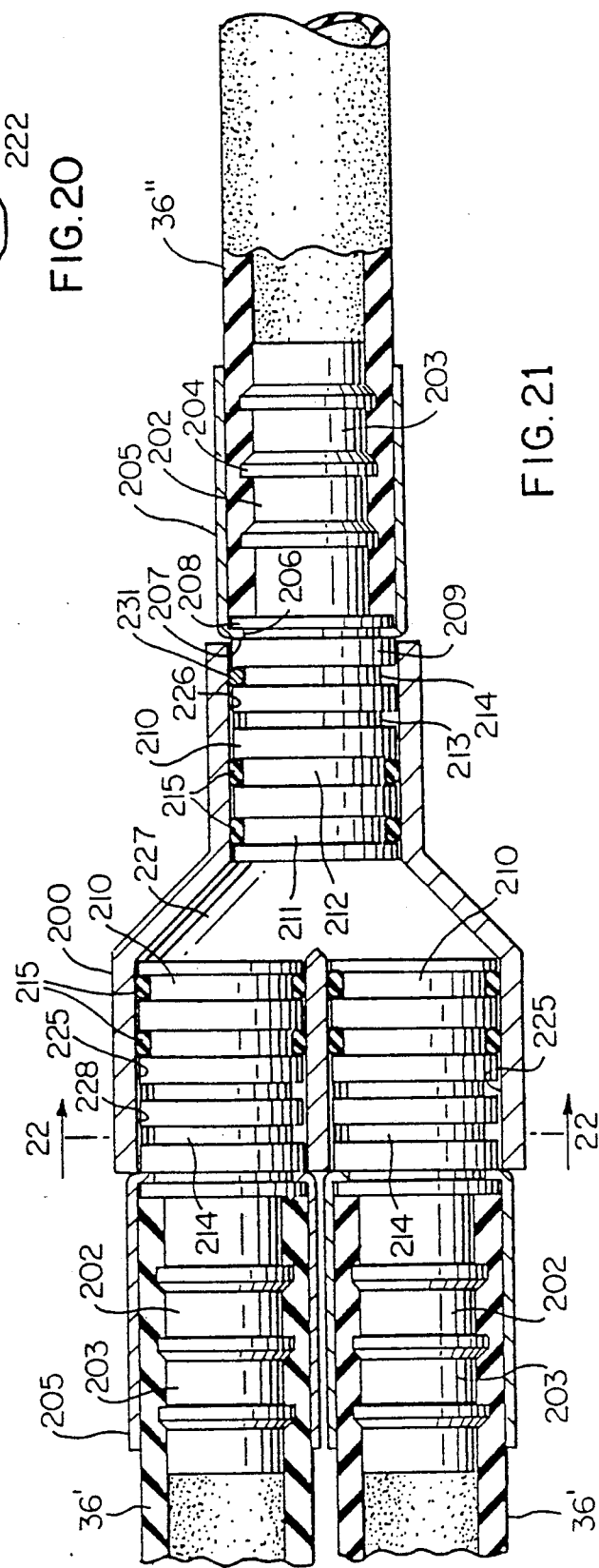
FIG. 21 is an enlarged fragmentary cross-sectional view of part of the hose assembly of FIG. 17.

In particular, the inner hose means 36 of the hose assembly 30 comprises a plurality of tubular members 202, FIG. 21, formed of any suitable material, such as metallic material, each tubular member 202 having a first section or end portion 203 provided with a plurality of outwardly directed annular ribs 204 disposed thereon in spaced relation and being adapted to be readily inserted into an end of one of the hoses 36', 36" or 36"' and be held thereon by a sleeve 205 that has been radially inwardly compressed and has an inwardly turned end 206 that is received in an annular groove 207 formed between an annular shoulder means 208 and an annular ring 209 of another end portion 210 of the coupling member 202 as illustrated in FIG. 21. Thus, it can be seen that the portion 203 of the tubular member 202 is very similar to the end 91 or 92 of the Venturi section 90 previously described and that the fastening sleeve 205 thereof is substantially the same as the sleeves 107 previously described.

The other end section or end portion 210 of each tubular member 202 has a plurality of annular grooves 211, 212, 213 and 214 formed therein in spaced apart relation and thereby permitting annular flexible or resilient sealing means 215 to be disposed in the annular grooves 211 and 212 thereof for projecting out of the same and sealing that tubular member 202 in various cylindrical arrangements receiving the same.

For example, it can be seen that the two tubular members 202 on the left-hand ends of the inner hoses 36' are adapted to be respectively telescopically received in the inlets 201 of the outlet means 65 so that the annular sealing means 215 thereof seal against internal peripheral surfaces 216 of the block 65 that define the inlets 201 as illustrated in FIG. 18 when the coupling nut 61 is threadedly disposed in the internally threaded opening 217 of the block 65.

Figure 20:
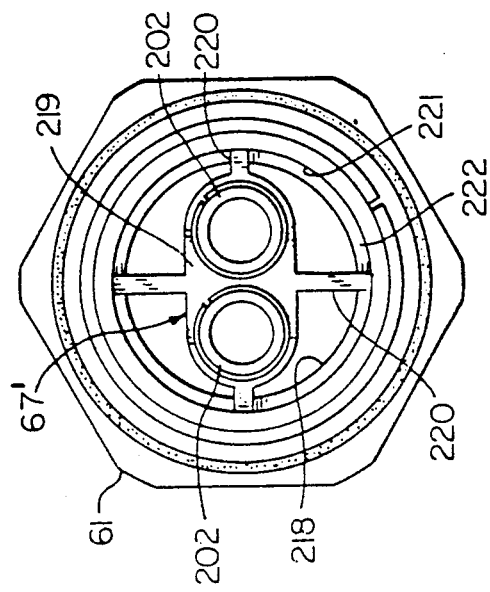
FIG. 20 is an enlarged end view of the hose assembly of this invention and is taken in the direction of the arrows 20—20 of FIG. 17.

In order to hold the tubular members 202 that are fastened to the left-hand end of the inner hoses 36' of the hose assembly 30 of FIG. 16 in the proper relation to the coupling 52 thereof, the tubular members 202 are respectively disposed through cooperating openings 218 formed in a body portion 219, FIG. 20, of the left-hand clip means 67' that has a plurality of spaced apart and outwardly radiating wings 220 thereof for bearing against an internal peripheral surface 221 of the coupling 52 as well as against an internal shoulder means 222 thereof. Thus, the tubular members 202 are properly positioned for insertion into the inlets 201 of the block 65 when the left-hand coupling means 52 is utilized to couple the hose assembly 30 thereto as illustrated in FIG. 18.

Figure 19:
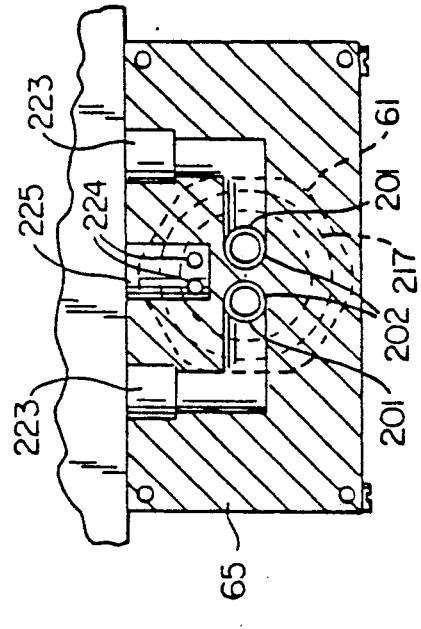
FIG. 19 is a fragmentary cross-sectional view taken on line 19—19 of FIG. 18.

It can be seen from FIGS. 18 and 19 that the outlets 201 of the block 65 respectively lead to passage means 223 that interconnect with the pump means 32 for receiving the different fuel flows that have different octane ratings as previously set forth. In addition, it can be seen in FIG. 19 that the block 65 has opening means 224 that communicate with the large opening 217 in the block 65 to interconnect with a passage 225 that leads to the vapor recovery system of the pump means 32 so that when the hose assembly 30 is coupled to the block 65 in the manner illustrated in FIG. 18, the vapor recovery passage means 41 is in fluid communication with the passage 225 of the block 65 so that the vapor recovery system of the pump means 32 can withdraw, by vacuum, any of the volatile vapors that are in the vapor recovery passage 41 of the hose assembly 30 for the purposes previously set forth.

Not only are the left-hand ends of the hoses 36' provided with the tubular members 202 that are fastened therein by the sleeves 205 so that the ends 210 thereof extend outwardly therefrom for the reasons previously set forth, but also the right-hand ends of the inner hoses 36' are respectively provided with the tubular members 202 as illustrated in FIGS. 17 and 21 which are respectively fastened therein by sleeves 205 in the manner previously set forth.

Likewise, the short hose length 36" has a tubular member 202 fastened to the left-hand end thereof as illustrated in FIGS. 17 and 21 while the right-hand end of the short hose length 36" and the left-hand end of the single inner hose 36''' are respectively secured by the sleeves 107 onto the Venturi section 90 in the manner previously set forth and as illustrated in FIG. 8.

The coupling unit 200 for the inner hose means 36 of the hose assembly 30 of this invention can be formed of any suitable material, such as metallic material, and can comprise a one-piece structure that is substantially Y-shaped to define two adjacent cylindrical inlet means 225 and one cylindrical outlet means 226, the inlet means 225 being interconnected to the outlet means 226 by a mixing chamber means 227 in the middle portion of the coupling member 200.

If desired one-way check valve means (not shown) could be provided in the inlet means 225 to permit fluid flow only toward the outlet means 226.

The cylindrical inlets 225 and the cylindrical outlet 226 of the coupling unit 200 respectively define smooth cylindrical internal peripheral surface means 228 of the coupling member 200 against which the annular sealing means 215 of the tubular members 200 of the hoses 36' and 36" sealingly engage when the end portions 210 are respectively disposed within the inlets 225 and outlet 226 in the manner illustrated in FIG. 21 so as to fluid seal the inner passage means 38 of the hoses 36' and 36" thereto.

Figure 22:
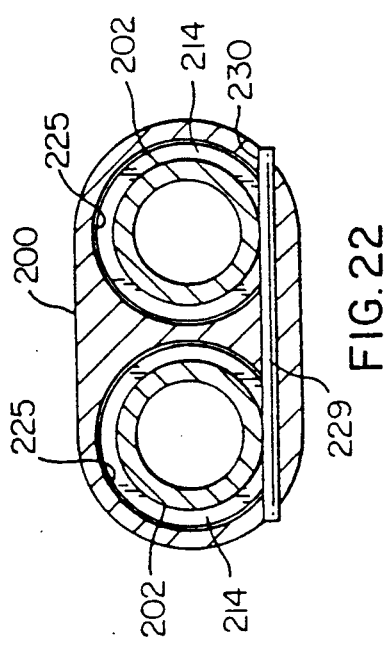
FIG. 22 is a cross-sectional view taken on line 22—22 of FIG. 21.

After the tubular members 202 of the hoses 36' and 36" have the end portions 210 thereof respectively disposed into the inlets 225 and outlet 226 in the manner illustrated in FIG. 21, the same can be fastened therein in any suitable manner. For example, in the embodiment illustrated in the drawings, a suitable metallic pin means 229 can be inserted through suitable opening means 230, FIG. 22, in the coupling unit 200 and be received in the aligned grooves 214 of the tubular members 202 of the hoses 36' as illustrated in FIG. 22 so as to prevent the same from being pulled out of the inlet means 225, such pin means 229 being staked or otherwise secured in the opening 230 to hold the same in place and could comprise a U-shaped member so as to have another leg thereof disposed on the other side of the members 202 if desired. In addition, a second pin means (not shown) could be utilized in the cooperating grooves 213 of the tubular members 202 for the hoses 36'.

Figure 24:
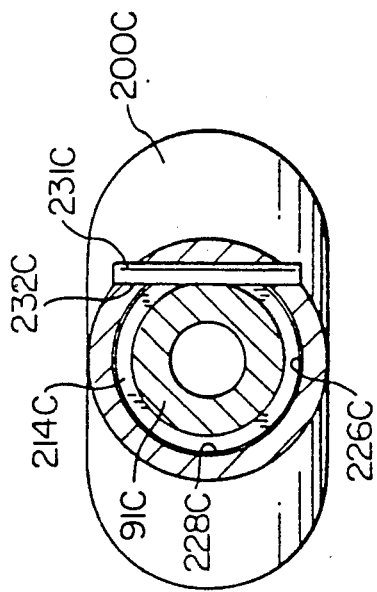
FIG. 24 is a cross-sectional view taken on line 24—24 of FIG. 23.

Likewise, a pin means 231 is disposed in opening means, such as opening means 232 of FIG. 24, of the coupling unit 200 to fasten the tubular member 202 of the short hose length 36" in the outlet means 226 as illustrated and an additional pin means can be utilized in the groove 213 thereof, if desired.

In any event, it can be seen that the coupling unit 200 is readily adapted to mix the liquid being dispensed thereto by the two hoses 36' in the mixing chamber 227 thereof and pass the mixed liquids out of the outlet means 226 into the short hose length 36" so as to be conveyed to the left side of the Venturi section 90 as illustrated in FIG. 17 and operate the Venturi section 90 in the manner previously set forth for preventing liquid from accumulating in the outer hose means 39, the Venturi means 90 dispensing such mixed liquid to the single outlet means 68 for the nozzle construction 34 to dispense the same to a vehicle gasoline tank or the like as previously set forth.

Therefore, it can be seen that the hose assembly 30 of this invention can be made by the method of this invention in a relatively simple and effective manner by merely fastening the tubular members 202 to the opposed ends of the hoses 36' and to the left-hand end of the short hose length 36" and then assembling the hoses 36' and 36" to the coupling member 200 by inserting the ends 210 of the tubular members 242 respectively into the inlet means 225 and outlet means 226 to be fastened therein by the pin means 229 and 231 as previously set forth. Before or after using the coupling unit 200, the right-hand end of the short hose length 36" can be fastened onto the end 91 of the Venturi section 90 in the manner illustrated in FIGS. 10 and 11 to provide the assembly as illustrated in FIG. 8 after the single hose 36''' has its left-hand end fastened onto the end 91 of the Venturi section 90 as illustrated in FIGS. 8, 10 and 11.

Thereafter, the completed inner hose means 36 for the hose assembly 30 can be assembled inside the outer hose means 39 after the outer hose means 39 has had the coupling means 52 fastened on the opposed ends thereof as previously set forth, the inner hose means 36 being assembled within the outer hose means 39 and being supported therein by the clip means 67 at the opposed end means thereof in the manner previously set forth.

Thereafter, such completed hose assembly 30 is adapted to be utilized with the dispensing pump means 32 by assembling the left-hand coupling means 52 thereof with the block 65 in the manner illustrated in FIG. 18 whereby the tubular members 202 of the inner hoses 36' are respectively sealingly disposed into the outlets 201 of the block 65 while the coupling means 52 is threadedly connected in the opening 217 as illustrated in FIG. 18. The right-hand coupling member 52 can then be interconnected to the nozzle means 34 so that the hose assembly 30 can now operate in a manner now to be set forth.

The operator operates the pump means 32 by selecting the desired octane rating of the gasoline to be dispensed therefrom and the pump means 32 will then dispense into the inner hoses 36' gasoline with two different ratings of octane so that when the same are mixed together in the mixing chamber 227 of the coupling unit 200, the liquid fuel being dispensed out of the coupling unit 200 into the short hose length 36" will have the desired octane rating thereof. This mixed gasoline will then pass through the Venturi section 90 and out of the dispensing nozzle construction 34 for flowing into the gas tank of the vehicle of the operator, the flow of fuel through the Venturi section 90 tending to remove any liquid that might accumulate in the outer passage means 41 of the hose assembly 30 for the reasons previously set forth so that the outer passage means 41 can recover any volatile vapors at the gasoline tank by having such vapors drawn through the passage means 41 back to the pump means 32 by the vapor recovery means thereof in the manner previously set forth.

While the Venturi section 90 of the hose assembly 30 of this invention is spaced from the coupling unit 200 by the short section 36" of the inner hose means 36 in order to permit the drape area 35 of the hose assembly 30 to have a relatively short straight section therein for the reasons previously set forth, it is to be understood that the Venturi section 90 can be directly interconnected to the coupling unit 200 by eliminating the short hose length 36" of the inner hose means 36 and by modifying the cooperating end 91 of the Venturi section 90 so that the same can be directly received in the outlet means 226 of the coupling unit 200 and be fastened therein by the fastening pin means 231 previously described.

Figure 23:
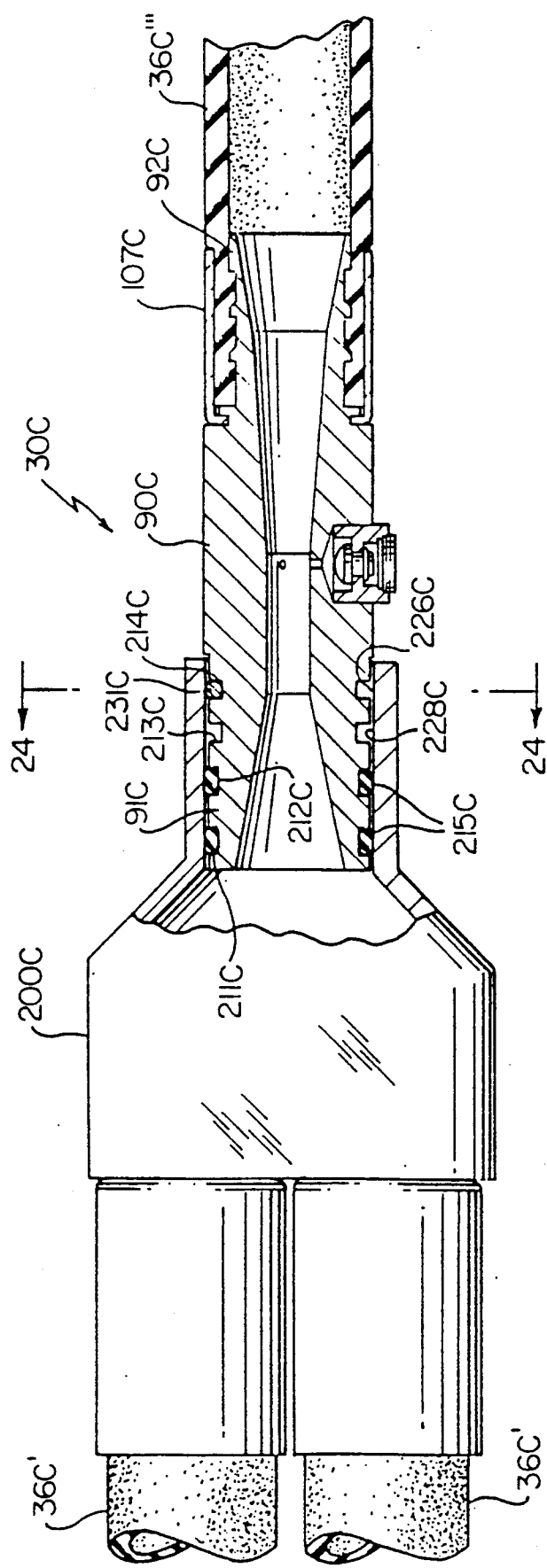
FIG. 23 is a view similar to FIG. 21 and illustrates another hose assembly of this invention.

In particular, reference is now made to FIGS. 23 and 24 wherein another hose assembly of this invention is generally indicated by the reference numeral 30C and parts thereof similar to the hose assembly 30 previously set forth are indicated by like reference numerals followed by the reference letter "C".

As illustrated in FIG. 23, the coupling unit 200C is the same as the coupling unit 200 previously described and the same has the plurality of hoses 36C' interconnected to the left-hand side thereof whereas the Venturi section 90C has the end 91C thereof formed in a manner to include the groove means 211C, 212C, 213C and 214C in the same manner as the end portion 210 of the tubular member 202 of this invention so that the end 91C can have the annular seal means 215C disposed in the grooves 211C and 212C for sealing with the internal peripheral surface means 228C of the inlet means 226C of the coupling member 200C in the manner illustrated in FIG. 23 and be fastened thereto by the fastening pin means 231 as previously set forth and as illustrated in FIG. 24. The other end 92C of the Venturi section 90C is fastened to the left-hand end of the single inner hose means 36C''' by the sleeve 107C in the manner previously set forth.

Thus, it can be seen that the coupling unit 200C and the Venturi section 90C are directly coupled together in the hose assembly 30C. However, the hose assembly 30C operates in substantially the same manner as the hose assembly 30 previously described so that a further description thereof is deemed unnecessary.

While the hose assemblies 30 and 30C of this invention merely provide two inner hoses 36' and 36C' as leading to one side of the Venturi sections 90 and 90C thereof, it is to be understood that more than two inner hoses can be provided for such purpose, if desired.

Also, while certain dimensions have been previously set forth, it is to be understood that other dimensions can be utilized for the various parts of the hose assembly of this invention.

Therefore, it can be seen that this invention not only provides a new hose assembly, but also this invention provides a new method of making such a hose assembly as well as a new fluid dispensing system using such hose assembly.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a hose assembly having a first fluid passage therein for conveying a volatile liquid in one direction to a container and a second fluid passage therein for returning the vapors of the volatile liquid from the container, the assembly comprising a flexible inner hose unit having an upper peripheral surface and defining said first fluid passage therein, and a flexible outer hose having an inner peripheral surface and being disposed around said inner hose unit, said inner peripheral surface of said outer hose and said outer peripheral surface of said inner hose unit defining said second fluid passage therebetween, said inner hose unit having a Venturi section therein that tends to remove liquid from a certain area of said second fluid passage, said inner hose unit having adjacent intermediate ends, said Venturi section having opposed ends respectively interconnected to said ends of said inner hose unit to provide said first passage therewith, the improvement wherein said inner hose unit comprises a plurality of separate inner hoses extending in said one direction to one end of said ends of said Venturi section and a single inner hose extending away from the other end of said ends of said Venturi section in said one direction, said inner hose unit comprising a coupling unit having a plurality of inlets and a single outlet interconnected to said plurality of inlets, said plurality of separate inner hoses being respectively interconnected to said plurality of inlets of said coupling unit, said inner hose unit comprising a flexible tubular length that interconnects said one end of said Venturi section to said outlet of said coupling unit and spaces said coupling unit from said Venturi section so that said coupling unit is disposed remote from said Venturi section.

2. A hose assembly as set forth in claim 1 wherein said plurality of separate hoses each has an end and a metallic tubular member secured to said end, each said tubular member of said plurality of separate inner hoses being disposed in an associated one of said plurality of inlets of said coupling unit.

3. A hose assembly as set forth in claim 2 wherein said inner hose unit comprises a plurality of annular seals respectively carried on said tubular members and respectively sealing with said coupling unit in said plurality of inlets thereof.

4. A hose assembly as set forth in claim 2 wherein said inner hose unit comprises a fastening device securing each said tubular member respectively to said coupling unit.

5. A hose assembly as set forth in claim 4 wherein said fastening device comprises a pin.

6. A hose assembly as set forth in claim 1 wherein said tubular length has an end and a metallic tubular member secured to said end, said tubular member being disposed in said outlet of said coupling unit.

7. A hose assembly as set forth in claim 6 wherein said inner hose unit comprises an annular seal carried on said tubular member and sealing with said coupling unit in said outlet thereof.

8. A hose assembly as set forth in claim 7 wherein said inner hose unit comprises a fastening device securing said tubular member to said coupling unit.

9. A hose assembly as set forth in claim 8 wherein said fastening device comprises a pin.

10. A hose assembly as set forth in claim 1 wherein said coupling unit comprises a one-piece metallic member.

11. A hose assembly as set forth in claim 1 wherein said hose assembly comprises spacers respectively carried by said plurality of separate inner hoses and being engageable with said inner peripheral surface of said outer hose.

12. A hose assembly as set forth in claim 1 wherein said hose assembly comprises a spacer carried by said single inner hose and being engageable with said inner peripheral surface of said outer hose.

* * * * *